(12) United States Patent
Kim

(10) Patent No.: US 8,560,976 B1
(45) Date of Patent: Oct. 15, 2013

(54) DISPLAY DEVICE AND CONTROLLING METHOD THEREOF

(71) Applicant: LG Electronics Inc., Seoul (KR)

(72) Inventor: Jihwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/722,652

(22) Filed: Dec. 20, 2012

(30) Foreign Application Priority Data

Nov. 14, 2012 (KR) .................. 10-2012-0128880

(51) Int. Cl.
*G09G 5/00* (2006.01)

(52) U.S. Cl.
USPC ........... 715/863; 715/702; 715/708; 715/825; 715/841

(58) Field of Classification Search
USPC ........... 715/702, 708, 863, 841; 345/156, 661
See application file for complete search history.

(56) References Cited

U.S. PATENT DOCUMENTS

| | | | |
|---|---|---|---|
| 6,323,884 B1 * | 11/2001 | Bird et al. ................. | 715/810 |
| 6,637,883 B1 * | 10/2003 | Tengshe et al. ............ | 351/210 |
| 7,372,473 B2 * | 5/2008 | Venolia ..................... | 345/661 |
| 2004/0160416 A1 * | 8/2004 | Venolia ..................... | 345/157 |
| 2005/0243054 A1 | 11/2005 | Beymer et al. | |
| 2006/0050142 A1 * | 3/2006 | Scott et al. ................ | 348/14.05 |
| 2006/0093998 A1 * | 5/2006 | Vertegaal ................... | 434/236 |
| 2007/0143697 A1 * | 6/2007 | Muller et al. .............. | 715/764 |
| 2011/0006978 A1 * | 1/2011 | Yuan ......................... | 345/156 |
| 2011/0134026 A1 * | 6/2011 | Kang et al. ................ | 345/156 |
| 2011/0175932 A1 * | 7/2011 | Yu et al. .................... | 345/661 |
| 2012/0036433 A1 * | 2/2012 | Zimmer et al. ............. | 715/702 |
| 2012/0105486 A1 | 5/2012 | Lankford et al. | |
| 2012/0169582 A1 * | 7/2012 | Tschirhart .................. | 345/156 |
| 2012/0225697 A1 | 9/2012 | Lee et al. | |
| 2012/0256833 A1 | 10/2012 | Chiang | |
| 2012/0272179 A1 | 10/2012 | Stafford | |

FOREIGN PATENT DOCUMENTS

KR 10-1098687 B1 12/2011

\* cited by examiner

*Primary Examiner* — Daeho Song
(74) *Attorney, Agent, or Firm* — Birch, Stewart, Kolasch & Birch, LLP

(57) ABSTRACT

Disclosed herein are a display device, which can control a user interface being displayed by a user's gaze and touch input, and a controlling method thereof and a controlling method of the same. The method for controlling the display device includes a hierarchical user interface and also includes displaying at least one control interface, detecting a user's gaze selecting one of the displayed control interface, transmitting information for providing a portable device with a sub-control interface of the control interface selected by the user's gaze, to the portable device, and receiving a control signal respective to the selected control interface from the portable device, and executing the received control signal. Herein, the portable device may provide the sub-control interface to a user with tactile feedback, may generate the control signal in accordance with a detected touch input, and may transmit the generated control signal to the display device.

19 Claims, 14 Drawing Sheets

FIG. 4
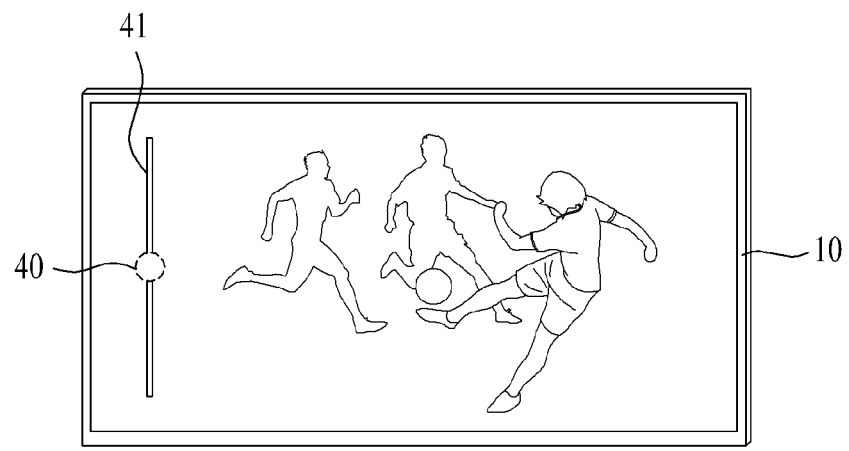
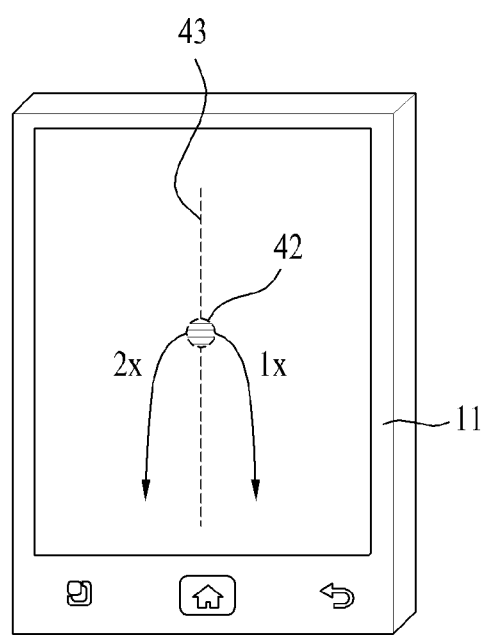

DISPLAY DEVICE AND CONTROLLING METHOD THEREOF

Pursuant to 35 U.S.C. §119(a). This application claims the benefit of the Korean Patent Application No. 10-2012-0128880, filed on Nov. 14, 2012, which is hereby incorporated by reference as if fully set forth herein.

BACKGROUND OF THE INVENTION

1. Field of the Invention

The present invention relates to a display device and, most particularly, to a device controlling a user interface being displayed by a user's gaze and touch input and a controlling method of the same.

2. Discussion of the Related Art

Recently, as the display devices are becoming large-sized, users have begun to view their display devices at remote distance. A user may use a remote controller to control his large-sized display device, such as a television set, from a remote distance. The remote controller may be connected to the display device by using communication means, such as infrared light rays, Bluetooth, and so on.

However, in the conventional remote controller, a control button was assigned to each function for controlling diverse functions being provided by the display device. Therefore, in order for the user to execute a wanted function at a remote distance, the user was required to undergo an inconvenient procedure of verifying the corresponding control button with his own eyes and operating the respective function. Each time the user wished to control the display device, the user was inevitably required to take his eyes off the contents being displayed on the display device in order to focus on the remote controller. Therefore, a remote-controlled display device is required to provide a method that can allow the user to continuously view the displayed contents without interruption while controlling the display device at the same time.

SUMMARY OF THE INVENTION

Accordingly, the present invention is directed to a display device and a controlling method thereof that substantially obviate one or more problems due to limitations and disadvantages of the related art.

An object of the present invention is to provide a display device required to provide a user interface that is controlled by using a user's gaze and touch input.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to an embodiment of the present invention, a display device includes a hierarchical user interface and also includes a display unit displaying at least one control interface, a sensor unit detecting a user's gaze in order to select at least one of the displayed control interfaces, a communication unit transmitting information for providing a portable device with a sub-control interface of a control interface, the control interface being selected by the user's gaze, to the portable device, and receiving a control signal respective to the selected control interface from the portable device, and a controller performing the received control signal. Herein, the portable device may receive the information transmitted from the display device, may provide the sub-control interface to a user as tactile feedback in accordance with the received information, may detect a touch input respective to the sub-control interface, and may generate a control signal with respect to the selected control interface in accordance with the detected touch input, thereby transmitting the generated control signal to the display device.

According to another embodiment of the present invention, a method for controlling the display device includes a hierarchical user interface and also includes a step of displaying at least one control interface, a step of detecting a user's gaze in order to select at least one of the displayed control interfaces, a step of transmitting information for providing a portable device with a sub-control interface of a control interface, the control interface being selected by the user's gaze, to the portable device, and receiving a control signal respective to the selected control interface from the portable device, and a step of performing the received control signal. Herein, the portable device may receive the information transmitted from the display device, may provide the sub-control interface to a user as tactile feedback in accordance with the received information, may detect a touch input respective to the sub-control interface, and may generate a control signal with respect to the selected control interface in accordance with the detected touch input, thereby transmitting the generated control signal to the display device.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 illustrates a method for providing a control interface by using a portable device according to an exemplary embodiment of the present invention;

DETAILED DESCRIPTION OF THE INVENTION

Figure 1:
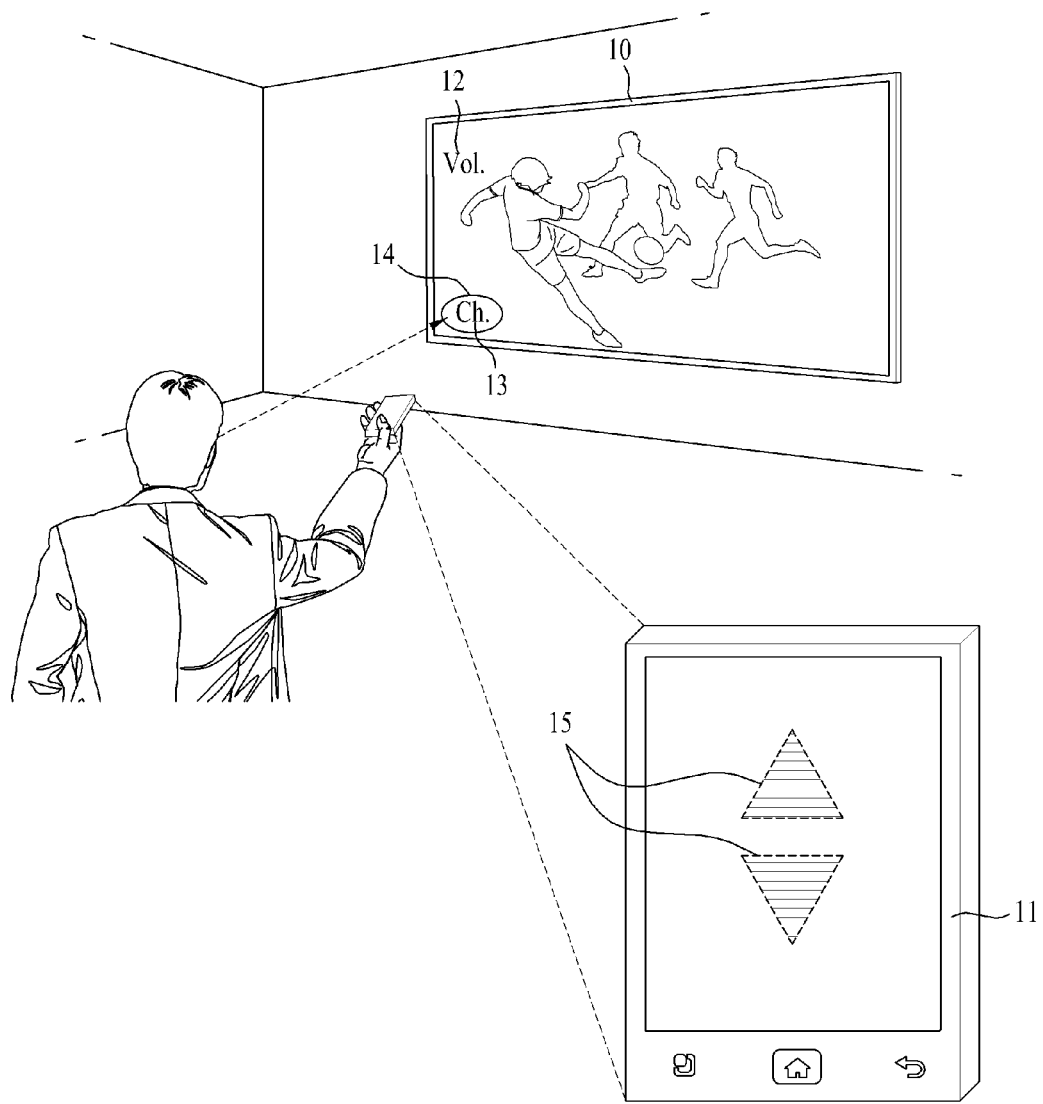
FIG. 1 illustrates a method for providing a control interface by recognizing a user's gaze according to an exemplary embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. And, the scope and spirit of the present invention will not be limited only to the exemplary embodiments presented herein.

Although the terms used in the present invention are selected from generally known and used terms, the detailed meanings of which are described in relevant parts of the description herein. It should be noted that the terms used herein may vary depending upon the intentions or general practice of anyone skilled in the art and also depending upon the advent of a novel technology. Some of the terms mentioned in the description of the present invention have been selected by the applicant at his or her discretion, terms used herein. Furthermore, it is required that the present invention is understood, not simply by the actual terms used but by the meaning of each term lying within.

In the description of the present invention, the display device may provide the user with a user interface so that the user can control the display device. Depending upon the method of providing the user interface, the user interface may include a visual interface, which is visually provided to the user, and a tactile interface, which is provided to the user through the user's tactile sense. The tactile interface may include tactile buttons, and the user may sense the tactile buttons through tactile feedback and may execute the respective function by touching or pressing the sensed tactile buttons. Additionally, the user interface may include a control interface, which may be selected by the user to control the display device in accordance with the respective function, and an information interface for displaying information. And, a structure of the user interface may have a hierarchical structure, and the user interface may include a subordinate user interface. According to the embodiment of the present invention, the user interface and the subordinate user interface may include the same user interface. For example, in case of mirroring the user interface, so as to provide each the mirrored user interfaces from two devices, the user interface that corresponds to the mirroring object may be referred to as the user interface, and the user interface that corresponds to the mirrored result may be referred to as the subordinate user interface. Furthermore, the subordinate user interface may correspond to a portion extracted from the user interface. In the following description of the present invention, the user interface may be referred to as an interface for simplicity. For example, a control user interface may be referred to as a control interface. And, the user interface may be named by combining at least two or more characteristics. For example, in the hierarchical structure, a user interface belonging to the subordinate user interface, being provided via tactile feedback, and controlling the device may be referred to as a tactile sub-control user interface or sub-control interface.

In the description of the present invention, the display device may correspond to an electronic device including a display unit and providing a user with a user interface. The display device may include an electronic device being equipped with a display unit, such as Head Mounted Displays (HMDs), laptop computers, smart pads, tablet personal computers (PCs), television receivers or smart tables, and so on. The display device may be connected to a portable device, so as to receive and transmit user interface information. The portable device may be connected to the display device, so as to receive and transmit user interface information. The portable device may correspond to an electronic device including a tactile feedback unit, so as to provide the user with a tactile user interface. Examples of the portable device may include a smart phone, a personal digital assistant (PDA), a cellular phone, an MP3 music player, a laptop computer, a smart pad, a remote controller, or a tablet personal computer (PC), each including a tactile feedback unit.

FIG. 1 illustrates a method for providing a control interface by recognizing a user's gaze according to an exemplary embodiment of the present invention. While viewing the display device 10, the user may control the display device 10 by using a portable device 11. The display device 10 may display a control user interface, so as to provide the displayed the control user interface to the user. And, by selecting a control user interface, which is displayed on the display device 10, with his gaze, the user may be capable of controlling the display device 10 by using the corresponding selected control user interface. The display device 10 may transmit to the portable device information enabling a sub-control user interface of the control user interface, which is selected by the user by using his gaze, to be provided to the portable device. Then, based upon the received information enabling a sub-control user interface of the control user interface to be provided to the portable device, the portable device may provide the user with the sub-control user interface of the control user interface, which is selected by the user by using his gaze. In FIG. 1, the display device 10 is illustrated as a television receiver. However, as described above, the display device 10 may also correspond to an electronic device including display units, such as Head Mounted Displays (HMDs), laptop computers, smart pads, tablet personal computers (PCs), smart tables, and so on.

The display device 10 according to the present invention may display a control user interface. The control user interface may include at least one of a volume control user interface, a channel control user interface, a playback control user interface, and a menu control user interface. According to the present invention, in addition to the control user interfaces mentioned above, the control user interface may further include other diverse control user interfaces controlling the display device. As shown in FIG. 1, the display device displays a volume control user interface 12 and a channel control user interface 13, thereby enabling the user to control the volume and channel of the contents that are being displayed on the display device 10.

The display device 10 may display an indicator 14 indicating to the control user interface, which is selected by the gaze of the user, that the corresponding control user interface is being selected by the gaze of the user. The display device 10, which is displaying the control user interface, may detect the gaze of the user. The display device 10 may track the movements of the user's gaze, so as to detect the area over the display unit which the user is looking at. Among the multiple control user interfaces that are displayed, as described above, the display device may decide the control user interface, which is selected by the gaze of the user. The display device may display an indicator 14 indicating to the control user interface, which is selected by the gaze of the user, that the corresponding control user interface is being selected by the gaze of the user. The indicator 14 may be displayed near the control user interface or may be displayed over the control user interface, which is selected by the gaze of the user.

The display device 10 may transmit to the portable device 11 information enabling a sub-control user interface of the control user interface, which is selected by the user by using his gaze, to be provided to the portable device. The information on the sub-control user interface may include information on the control user interface, which is selected by the user by using his gaze. Additionally, the information on the sub-control user interface may also include information on the type, shape, and size of the corresponding sub-control user interface. Furthermore, the information on the sub-control user interface may also include information for activating a sub-control user interface, which is stored in the portable device.

The portable device 11 may use the information enabling a sub-control user interface to be provided to the portable device, which is received from the display device 10, so as to provide the user with the corresponding sub-control user interface 15. For example, when the control user interface, which is selected by the user by using his gaze, corresponds to the channel control user interface 13, the portable device 11 may provide Channel Up and Channel Down buttons enabling the user to change channels. In providing the sub-control user interface 15, the portable device may provide tactile buttons by using tactile feedback. The portable device may provide tactile buttons in accordance with the type, shape, and size of the sub-control user interface. Accordingly, by using the tactile buttons, the portable device may be capable of detecting and recognizing the functions of the sub-control user interface simply based upon the touch of the user.

The user may use the tactile buttons of the sub-control user interface 15 of the portable device 11, so as to control the display device 10 with respect to the control user interface, which is selected by the user with his gaze. More specifically, if the user has selected the channel control user interface 13 of the display device 10 by using his gaze, the user may be capable of controlling the channels of the display device 10 by using the sub-control user interface including the Channel Up and Channel Down buttons, which are provided to the portable device.

Figure 2:
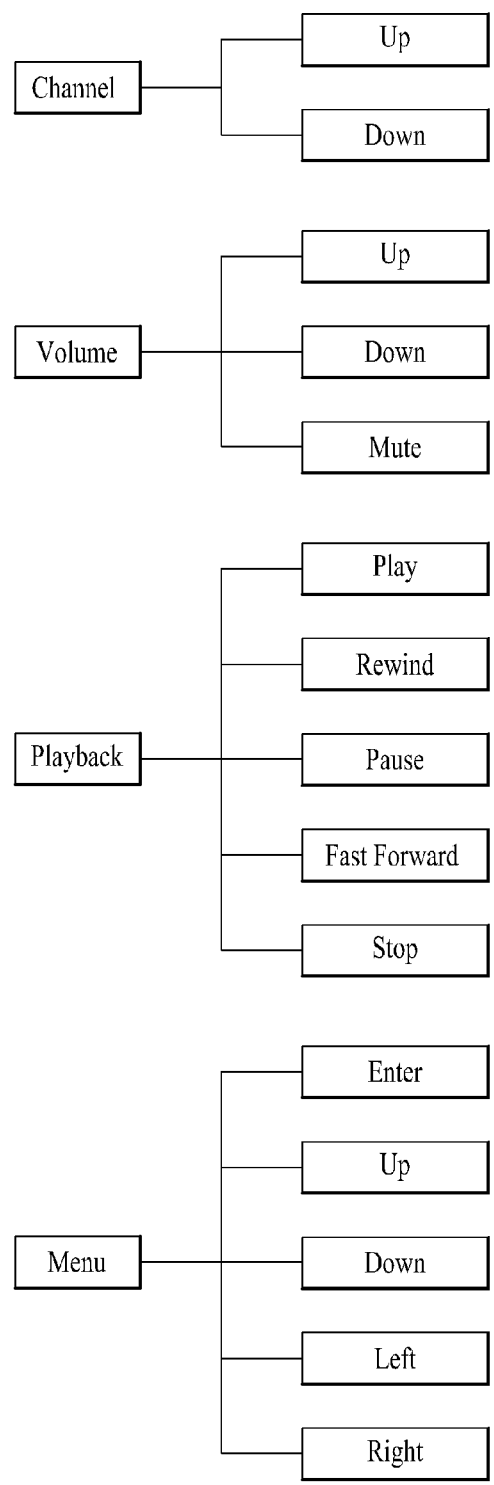
FIG. 2 illustrates a hierarchical control interface according to an exemplary embodiment of the present invention.

FIG. 2 illustrates a hierarchical control user interface according to an exemplary embodiment of the present invention. A hierarchical control user interface may include a control user interface and a sub-control user interface. The control user interface may correspond to a user interface selecting a function of the display device. And, the control user interface may include at least any one of channel control, volume control, playback control, and menu control. Each control user interface may include at least one or more sub-control user interface. A channel control user interface may include a Channel Up and Channel Down interface for controlling the channels. Herein, the Channel Up and Channel Down interface may correspond to a sub-control user interface of the channel control user interface. A volume control user interface may include a Volume Up, Volume Down, and Mute interface controlling the volume. Herein, the Volume Up, Volume Down, and Mute interface may correspond to a sub-control user interface of the volume control user interface. A playback control user interface may include at least any one of Play, Rewind, Pause, Fast Forward, and Stop interfaces with respect to the contents being displayed. Herein, the Play, Rewind, Pause, Fast Forward, and Stop interfaces may correspond to sub-control user interfaces of the playback control user interface. A menu control user interface may include at least one of Up, Down, Left, Right, and Enter interfaces, enabling the user to search and select at least one of a plurality of displayed menus. Herein, the Up, Down, Left, Right, and Enter interfaces may correspond to sub-control user interfaces of the menu control user interface.

Figure 3:
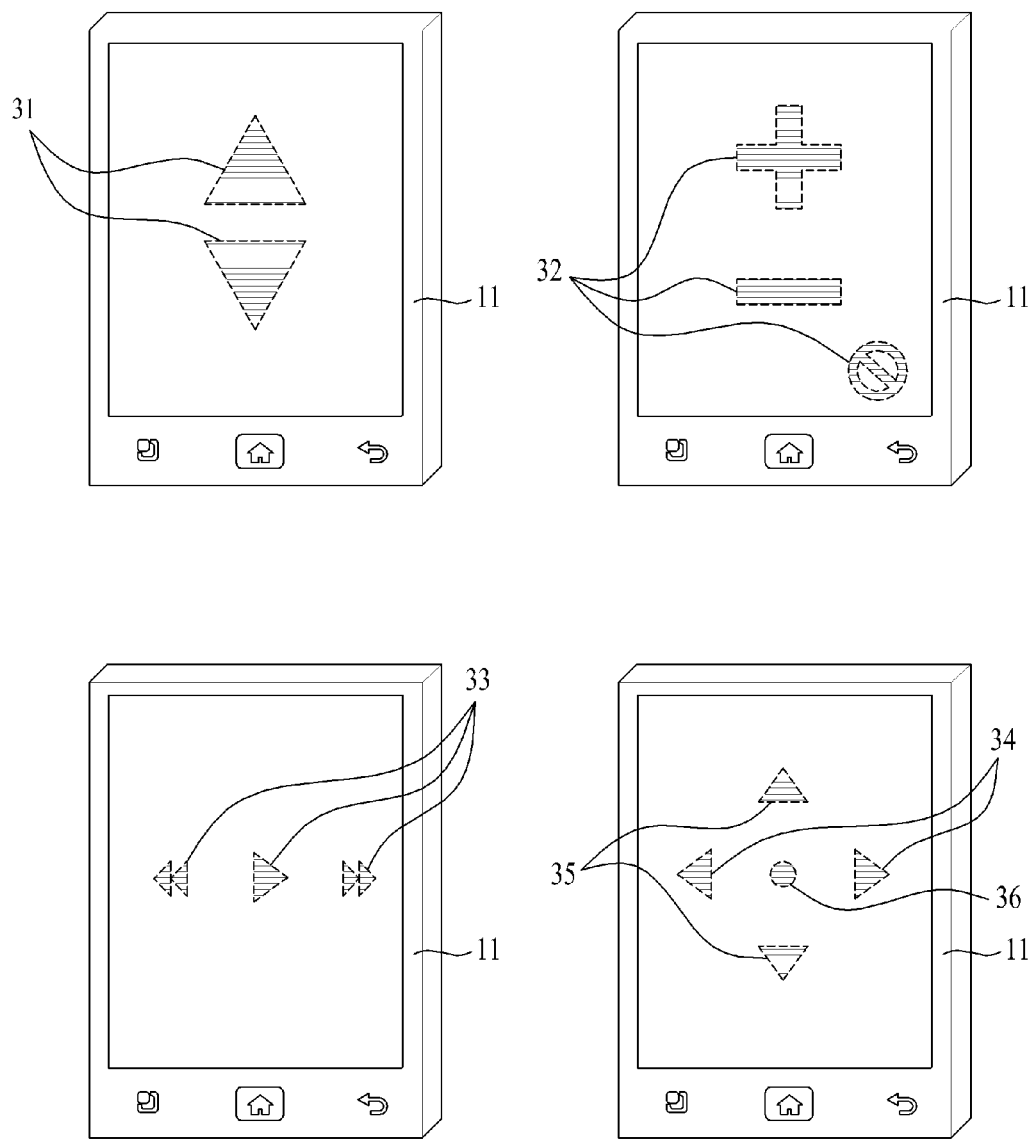
FIG. 3 illustrates a tactile button provided by a sub-control interface according to an exemplary embodiment of the present invention.

FIG. 3 illustrates a tactile button provided by a sub-control user interface according to an exemplary embodiment of the present invention. The portable device 11 may provide a sub-control user interface in accordance with the information for providing a sub-control user interface, which is received from the display device. The portable device may generate tactile buttons corresponding to the sub-control user interface by using tactile feedback. The tactile buttons may be generated with respect to the position, shape, and size of the sub-control user interface.

The portable device 11 may generate tactile buttons respective to the sub-control user interface of the channel control user interface. For example, as shown at the upper left portion of FIG. 3, the portable device 11 may provide the user with a Channel Up and Channel Down interface 31 in the form of tactile buttons each having the shape of a triangle and an inverse triangle.

The portable device 11 may generate tactile buttons respective to the sub-control user interface of the volume control user interface. For example, as shown at the upper right portion of FIG. 3, the portable device 11 may provide the user with a Volume Up, Volume Down, and Mute interface 32 in the form of tactile buttons each having the shape of a plus sign, a minus sign, and a stop sign.

The portable device 11 may generate tactile buttons respective to the sub-control user interface of the playback control user interface. For example, as shown at the lower left portion of FIG. 3, the portable device 11 may provide the user with Play, Fast Forward, and Rewind interfaces 33 in the respective form of tactile buttons.

The portable device 11 may generate tactile buttons respective to the sub-control user interface of the menu control user interface. For example, as shown at the lower right portion of FIG. 3, the portable device 11 may provide the user with a Left and Right interface 34, and Up and Down interface 35, and an Select interface 36 in the respective form of tactile buttons.

FIG. 4 illustrates a method for providing a control user interface by using a portable device according to an exemplary embodiment of the present invention. The exemplary embodiment of the present invention corresponds to an exemplary embodiment, which mirrors a user interface being displayed on the display device 10, so as to provide portable device 11 with the mirrored user interface as the subordinate user interface. The display device 10 may display the control user interface along with the contents. The control user interface may include a slider user interface. The slider user interface may include a movable slider 40 and a bar 41. The display device 10 may transmit information on the slider user interface to the portable device 11. The portable device may provide the user with a slider user interface corresponding to the received information on the slider user interface. The portable device may provide the user with a tactile slider user interface, which can be felt by the touch of the user using tactile feedback. The tactile slider user interface may include a tactile slider 42 and a tactile bar 43. The user may control the display device by moving the tactile slider 42 of the portable device 11 over the tactile bar 43.

The portable device 11 may control the display device differently based upon whether the user has moved the tactile slider 42 towards the left side area or towards the right side area with respect to the tactile bar 43. In FIG. 4, the tactile slider user interface is illustrated to be provided along the vertical direction, so that the tactile bar 43 can be divided into left and right area. However, when the tactile slider user interface is illustrated to be provided along the horizontal direction, the tactile bar 43 may be divided into upper and lower area. An example of the case when the tactile bar is divided into left and right area, as shown in FIG. 4, will hereinafter be described in detail.

For example, when the user drags the tactile slider 42 from the right side of the tactile bar 43, a control speed for controlling the display device 10 may be controlled to a single speed (i.e., 1× speed). Additionally, when the user drags the tactile slider 42 from the left side of the tactile bar 43, a control speed for controlling the display device 10 may be controlled to a double speed (i.e., 2× speed). In case of controlling a playback speed of a set of contents by using the tactile slider user interface, when the user drags the tactile slider 42 from the right area of the tactile bar 43, the contents may be played-back at a single speed (i.e., 1× speed). And, when the user drags the tactile slider 42 from the left area of the tactile bar 43, the contents may be played-back at a double speed (i.e., 2× speed). Additionally, in case of controlling the volume of the contents by using the tactile slider user interface, when the user drags the tactile slider 42 from the right area of the tactile bar 43, the volume of the contents may be adjusted by 1 scale. And, when the user drags the tactile slider 42 from the left area of the tactile bar 43, the volume of the contents may be adjusted by 2 scales.

In the description provided above, an operating method of the tactile slider user interface is described by dividing the touch screen into two different area with respect to the tactile bar 42. However, depending upon the exemplary embodiment of the present invention, the tactile slider user interface may be operated in accordance with three different cases, such as a case when a dragging motion is performed from over the tactile bar 42, a case when a dragging motion is performed from the right side of the tactile bar 42, and a case when a dragging motion is performed from the left side of the tactile bar 42.

Figure 5:
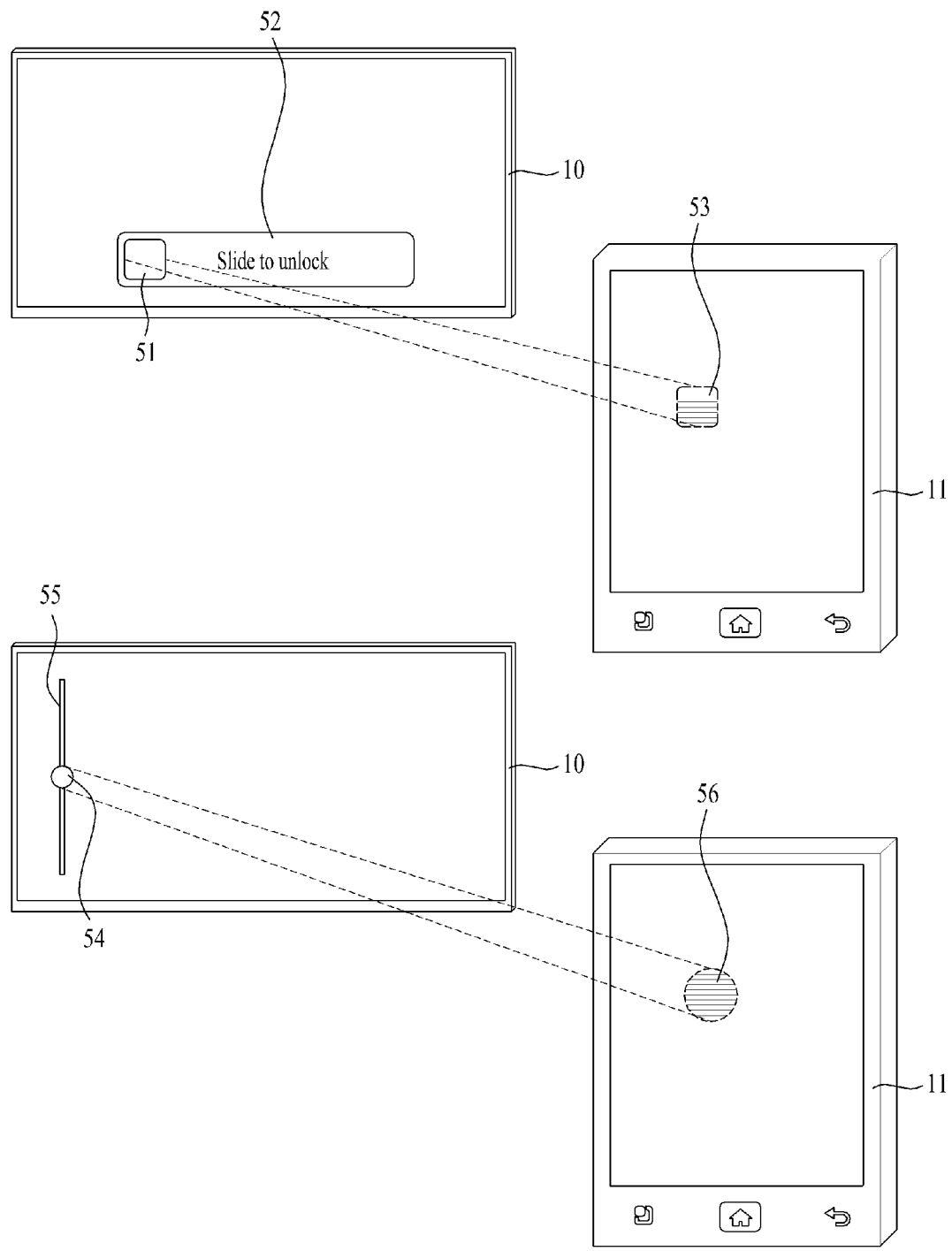
FIG. 5 illustrates a method for providing a control interface by using a portable device according to another exemplary embodiment of the present invention.

FIG. 5 illustrates a method for providing a control user interface by using a portable device according to another exemplary embodiment of the present invention. This embodiment of the present invention corresponds to an embodiment that extracts a portion of the user interface, which is displayed on the display device 10, and providing the extracted portion of the user interface to the portable device 11 as a subordinate user interface. The display device 10 may display the control user interface along with the contents. The control user interface may include diverse types of user interfaces. The slider user interface may include movable sliders 51 and 54 and bars 52 and 55. The display device may transmit information on the slider user interface to the portable device 11. The portable device may provide the user with a slider user interface respective to the received information on the slider user interface. The portable device may provide the user with a tactile slider user interface that can be felt by the user using tactile feedback. The portable device 11 may provide the user with only the sliders 51 and 54, which are extracted from the slider user interface being displayed on the display device 10, as the tactile slider user interface. More specifically, the tactile slider user interface provided by the portable device may include only the tactile sliders 53 and 56 excluding the bars 52 and 54. By moving the tactile sliders 53 and 56 of the portable device 11 over the touch screen, the user may control the display device.

In providing the tactile sliders 53 and 56 to the user, the portable device 11 may provide tactile sliders 53 and 56 to area where a touch input of the user is detected within the touch screen. In FIG. 5, the portable device is illustrated to provide the tactile sliders 53 and 56 at the center of the touch screen. However, depending upon the embodiment of the present invention, the portable device 11 may detect which area of the touch screen is being touched by the user's finger, so as to provide the tactile sliders 53 and 56 at the corresponding area. Therefore, it will be advantageous in that the user can immediately control the tactile sliders 53 and 56 located in the area he is touching with his finger. Accordingly, the user may not be required to perform any separate tactile sliders 53 and 56 selecting operations in order to select the tactile sliders 53 and 56.

Figure 6:
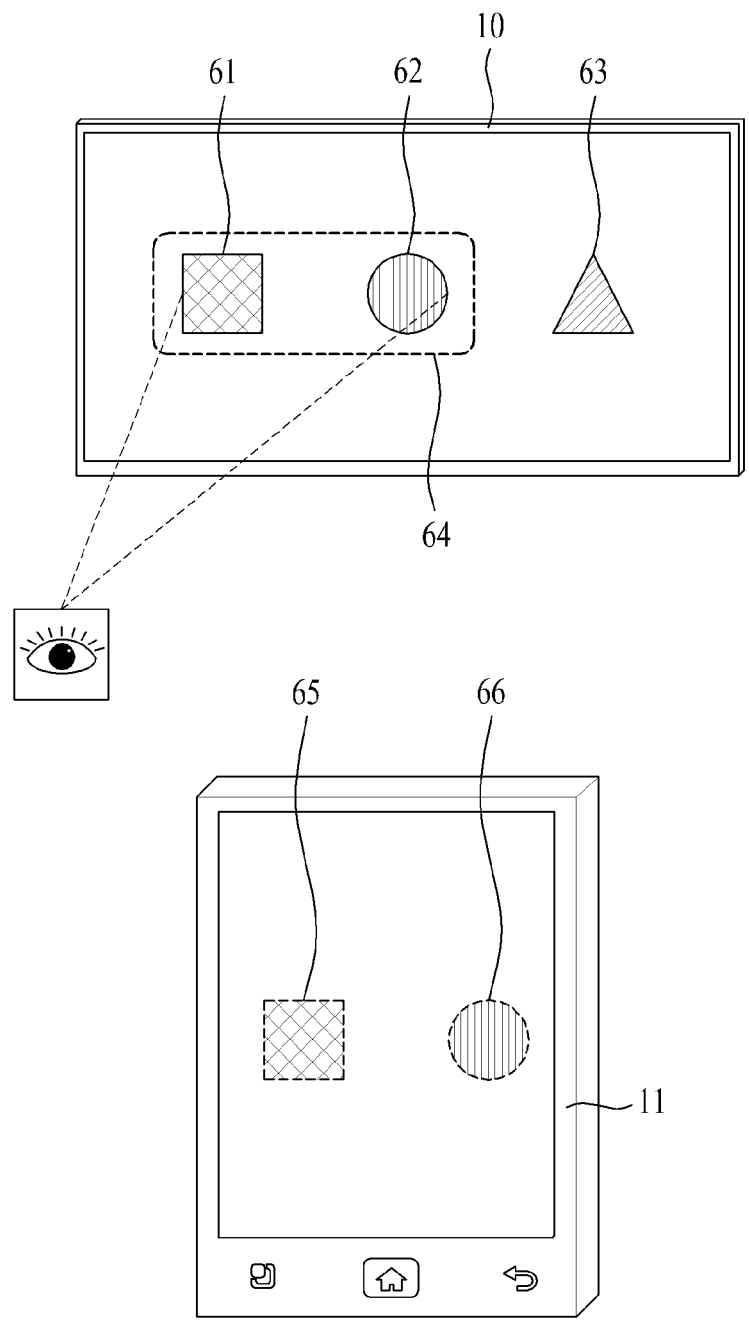
FIG. 6 illustrates a method for displaying a gaze indicator according to an exemplary embodiment of the present invention.

FIG. 6 illustrates a method for displaying a gaze indicator according to an exemplary embodiment of the present invention. The display device 10 may detect the user's gaze so as to indicate which area of the screen of the display device 10 is being focused by the user. For example, the display device may display three control user interfaces 61, 62, and 63. Among the display control user interfaces, when the user's gaze selects the two control interfaces 61 and 62, which are located on the left side, the display device may detect the user's gaze and may display a gaze indicator 64 respective to the control user interfaces 61 and 62, which are selected by the user with his gaze. In FIG. 6, an example of displaying a gaze indicator 64 separate from the control user interfaces 61 and 62 has been described. However, depending upon the embodiments of the present invention, a gaze indicator, which can modify the control user interface itself, may be used so as to indicate that the user's gaze is focusing on the corresponding control user interface. The user may visually verify which control user interface is being selected by his gaze. When the user's gaze is detected, the display device 10 may display the gaze indicator 64 and may transmit information on the control user interfaces 61 and 62, which are selected by the user's gaze, to the portable device 11.

The portable device 11 may provide tactile control user interfaces 65 and 66 respective to the information on the control user interfaces 61 and 62 being received from the display device. Accordingly, the user may use his touch, so as to sense and detect the corresponding tactile control user interfaces 65 and 66, thereby controlling the display device 10 through the portable device 11.

Eventually, while viewing the contents of the display device 10, the user may verify the control user interface, which is being selected by his viewing attention, without being interrupted from viewing the displayed contents, through the gaze indicator 64 being displayed on the display device 10. Then, the user may control the display device 10 by using the tactile control user interfaces 65 and 66, which are provided by the portable device 11, based upon the verified control user interface.

The display device 10 may also transmit information on the control user interface 63, which is located outside of the gaze range of the user. In this case, the portable device 11 may provide the user with a mini-version of the tactile control user interface respective to the control user interface 63, which is located outside of the gaze range of the user. More specifically, the portable device 11 may control the size of the multiple tactile control user interfaces, which are provided regardless of the presence or absence of the user's gaze, so that the multiple tactile control user interface can be differentiated from one another based upon the user's touch. While providing the control user interface, which is selected by the user's gaze, the size of a control user interface that is not focused by the user's gaze may be reduced, so as to be provided as the tactile control user interface.

Figure 7:
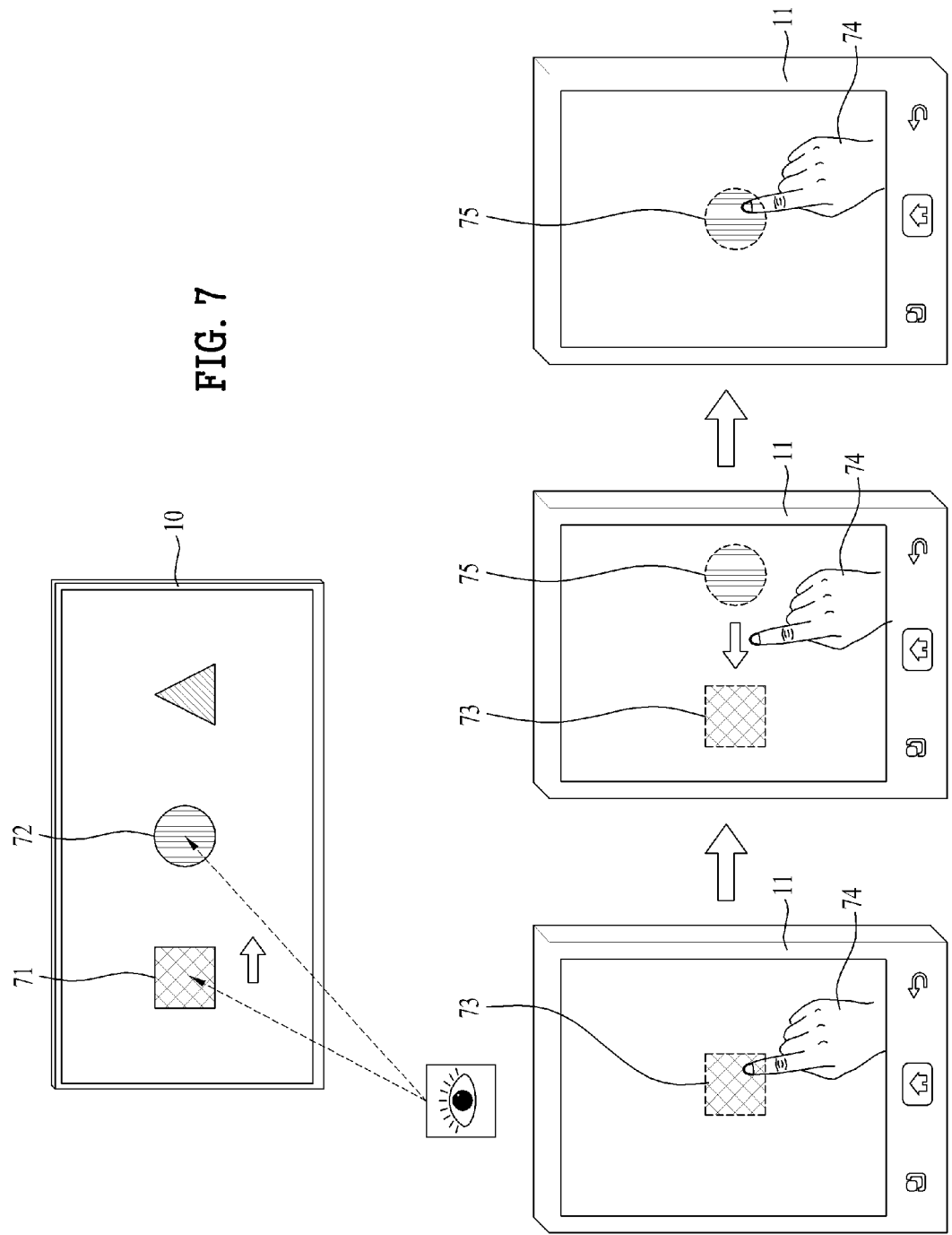
FIG. 7 illustrates a tactile control interface that moves with respect to the user's gaze according to an exemplary embodiment of the present invention.

FIG. 7 illustrates a tactile control user interface that moves with respect to the user's gaze according to an exemplary embodiment of the present invention. The display device 10 may sense the movement of the user's gaze, thereby being capable of detecting which control user interface is being selected by the user with his gaze. As the gaze of the user moves, the display device may modify the information for providing the sub-control user interface, which is transmitted to the portable device 11, and may transmit the modified information to the portable device. Additionally, the portable device 11 may receive the modified information for providing the sub-control user interface to the portable device, so as to modify the tactile control user interface, which is provided to the user, and to provide the modified tactile control user interface.

As shown in FIG. 7, the display device 10 may display control user interfaces 71 and 72. The user may select a first control user interface 71 with his gaze and may use the selected first control user interface 71 so as to control the display device 10. Herein, the display device 10 may transmit information on the first control user interference 71 to the portable device 11. Additionally, in order to control the display device 10 by using a second control user interface 72, the user may shift the focus of his gaze to the second control user interface 72, so as to control the second control user interface 72. The display device 10 may detect that the user's gaze is being shifted from the first control user interface 71 to the second control user interface 72. When the control user interface having the gaze of the user focused thereon is changed, the information on the first control user interface 71 being transmitted to the portable device 11 may be switched to the information on the second control user interface 72 and then transmitted. Furthermore, the display device 10 may also transmit information on a movement direction or path of the gaze of the user to the portable device 11.

When the user selects the first control user interface 71 by using his gaze, the portable device 11 may receive information on the first control user interface 71 from the display device 10 and may provide the received information to a first tactile control user interface 73. The portable device 11 may provide the first tactile control user interface 73 at a position contacted by the user's finger 74. The user may be aware that the first tactile control user interface 73 is being provided at the position contacted by his finger 74. As the gaze of the user is moved, when the portable device 11 receives information on the second tactile control user interface 75, the portable device 11 may provide the user with the second tactile control user interface 75. By moving the location of the first tactile control user interface 73, which was initially provided, the second tactile control user interface 75 at another position contacted by the user's finger 74.

The information for providing the control user interface to the portable device, the information being received from the display device 10 may include position information of the control user interface. Accordingly, the portable device 11 may use the position information of each control user interface, so as to change the tactile control user interface. For example, as shown in FIG. 7, when the gaze of the user is shifted from the first control user interface 71 to the second control user interface 72, the portable device 11 may receive information on the first control user interface 71 and information on the second control user interface 72. Accordingly, by using the position information being included in the information for providing each sub-control user interface to the portable device, as the first tactile control user interface 73 is moved to the left side, and the second tactile control user interface 75 may be provided after being moved to a new position contacted by the user's finger 74 from the right side area.

Additionally, the portable device 11 may receive information on the movement direction or path of the gaze of the user from the display device 10, so as to change the tactile control user interface being provided to the user. For example, the portable device 11 may receive user gaze information, which indicates that the gaze of the user is moving rightwards starting from the first control user interface 71 and that the second control user interface 72 is selected by using the gaze of the user. The portable device 11 may use the information for providing the first and second control user interfaces to the portable device and the user gaze information, so as to move the first tactile control user interface 73 to the left side, and to provide the second tactile control user interface 75 to a new position being contacted by the user's finger 74 from the right side area. Eventually the user may locate the second tactile control user interface 75 to the finger touched area by simply moving his gaze, and the user may control the display device by using the second tactile control user interface 75.

According to another embodiment of the present invention, while the user uses the tactile control user interface, the portable device may bypass the information for providing the control user interface to the portable device, the information being received from the display device. Accordingly, this may prevent the tactile control user interface from being changed to another tactile control user interface due to the movement of the user's gaze, while the user is using the selected tactile control user interface.

According to yet another embodiment of the present invention, when the user's touch input is detected, the portable device may transmit information, which indicates that the user is controlling the tactile sub-control user information, to the display device. After receiving the corresponding information, the display device may temporarily interrupt a process of updating information for providing the portable device with a sub-control user interface in accordance with the movement of the user's gaze.

Figure 8:
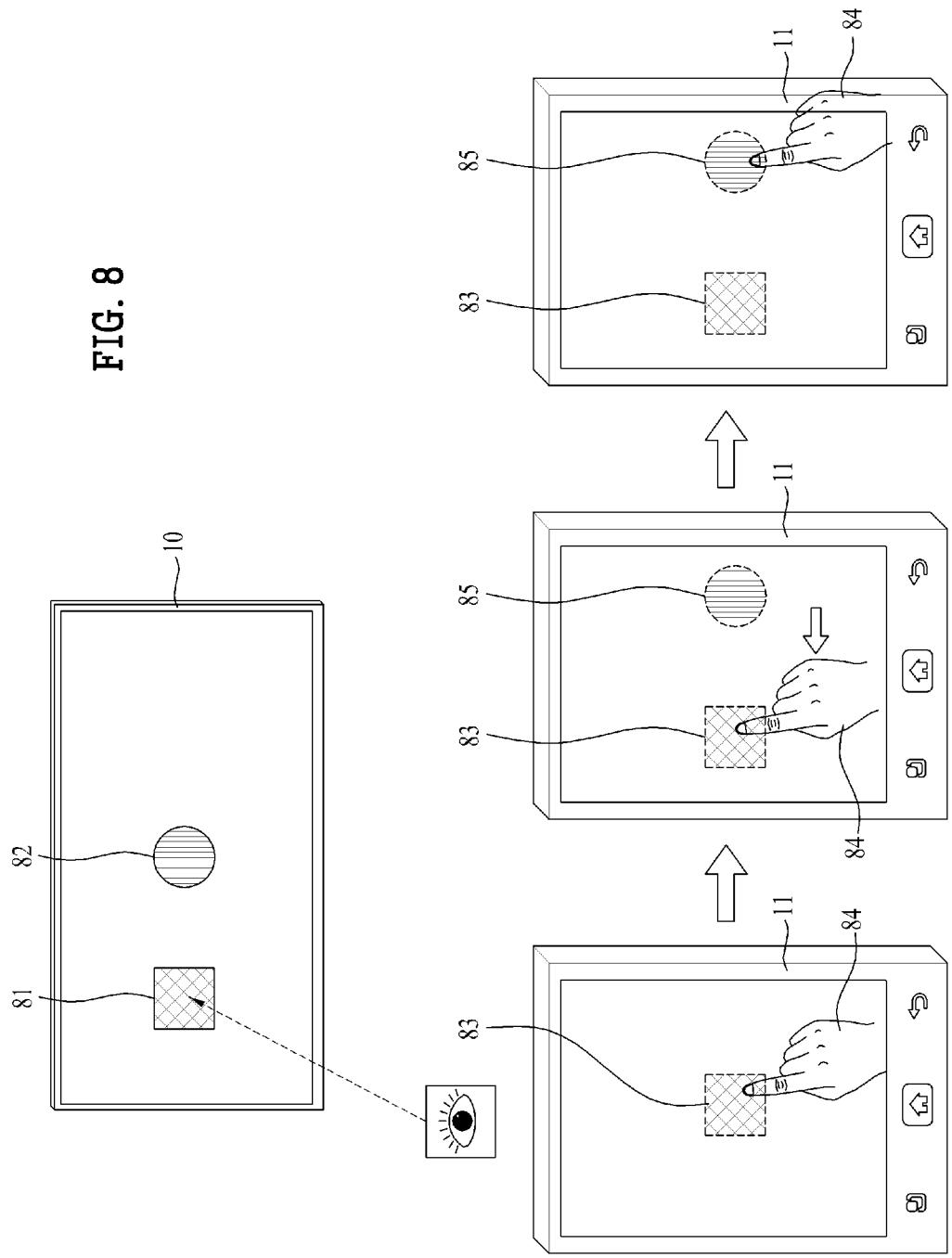
FIG. 8 illustrates a tactile control interface that moves with respect to the user's touch according to an exemplary embodiment of the present invention.

FIG. 8 illustrates a tactile control user interface that moves with respect to the user's touch according to an exemplary embodiment of the present invention. The portable device 11 may receive the information for providing a control user interface to the portable device from the display device 10. The display device 10 may transmit to the portable device 11 not only the information for providing the control user interface, which is focused on by the user's gaze, but also the information for providing the portable device with another control user interface, which is being displayed. The user may use a touch input within a limited screen area, so as to not only select the control user interface, which is currently being selected by his gaze, but also to select another control user interface, thereby controlling the display device 10.

The display device 10 may display multiple control user interfaces 81 and 82. The display device 10 may collectively transmit not only information on the first control user interface 81, which the user's gaze is focused on, but also information on the second control user interface 82, which is located near the first control user interface 81, to the portable device 11. Herein, the information on the first control user interface 81 may include information indicating that the user's gaze is focused thereon.

The portable device 11 may receive information on the first control user interface 81 and information on the second control user interface 82 from the display device 10. The portable device 11 may use the information on the first control user interface 81, which is selected by the user using his gaze, so as to provide a first tactile control user interface 83. The first tactile control user interface 83 may be provided at an area that is contacted by the user's finger 84 on the portable device 11. The portable device 11 may allow the user to use his touch in order to detect the first tactile control user interface 83 through tactile feedback using a tactile feedback unit.

When the user seeks to select the first control user interface 81 with his gaze and seeks to use the second control user interface 82, which is located at the right side of the first control user interface 81, the user may drag a first tactile control user interface 83, which is provided by the portable device 11, leftwards so as to use a second tactile control user interface 85. The portable device 11 may move the first tactile control user interface 83 leftwards in accordance with the drag touch input of the user and may then provide the second tactile control user interface 85. The user may use the provided second tactile control user interface 85, so as to control the display device 10.

Eventually, the user may use the second tactile control user interface 85, which is provided to the portable device 11, by using only the touch input without moving the user's gaze focused on the control user interface, so as to control the display device 10.

Figure 9:
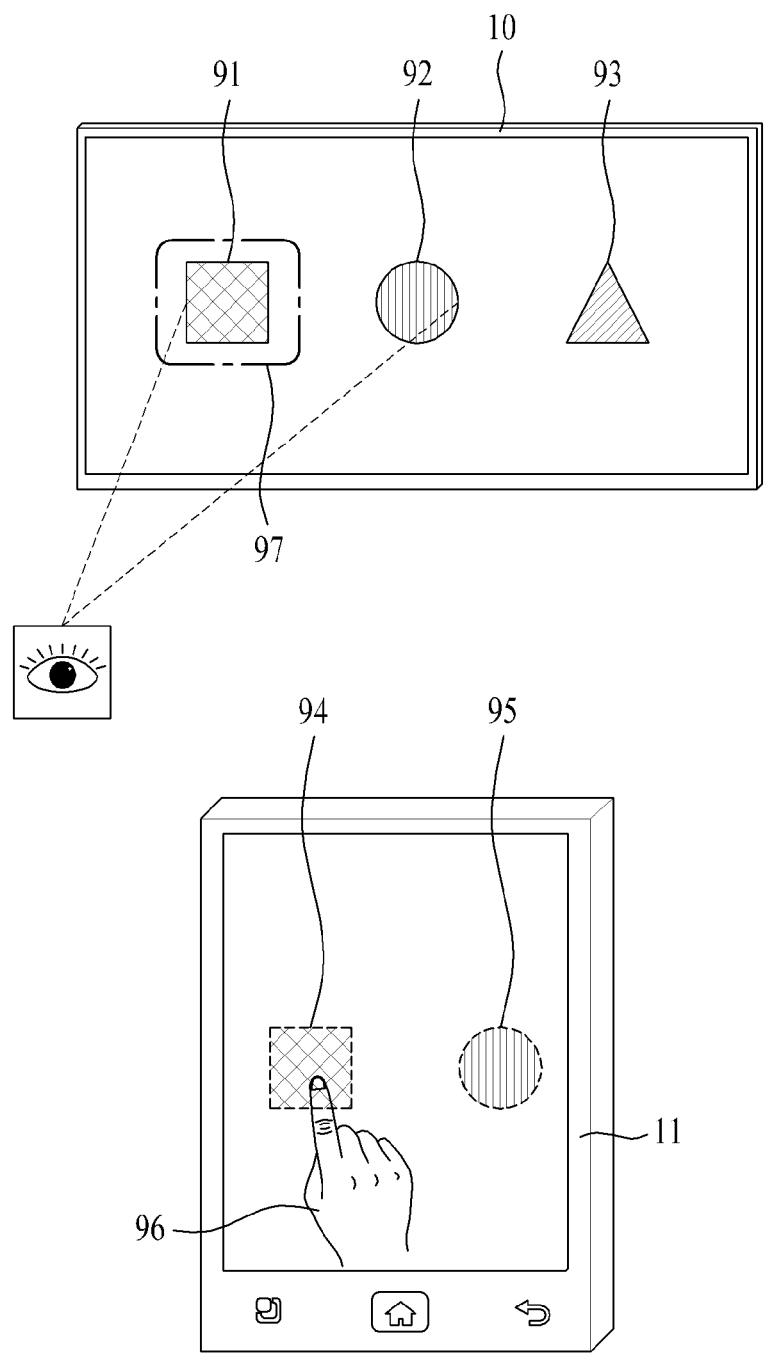
FIG. 9 illustrates a method for displaying a touch indicator according to an exemplary embodiment of the present invention.

FIG. 9 illustrates a method for displaying a touch indicator according to an exemplary embodiment of the present invention. The display device 10 may display multiple control user interfaces 91, 92, and 93. The display device may detect the gaze of the user, so as to transmit information on the multiple control user interfaces 91 and 92, which are included in the gaze range of the user, to the portable device 11. The portable device may provide the user with multiple tactile user interfaces 94 and 95 in accordance with the information on the multiple user interfaces 91 and 92, which are received from the display device 10. The user may use a touch input 96 so as to select one 94 of the multiple tactile user interfaces, so as to control the display device 10. The portable device 11 may detect the touch input respective to the tactile control user interface of the user and may transmit a control signal respective to the detected touch input to the display device 10, so as to control the display device 10. Based upon the received control signal received from the portable device, the display device 10 may display a touch indicator 97 indicating which one of the multiple control user interfaces is being controlled by the user. In order to indicate that a specific control user interface is being controlled by the user, the display device 10 may display a touch indicator 97 near the control user interface, which is being controlled by the user, or the display device 10 may modify the corresponding control user interface and then display the changed modified control user interface. For example, the display device 10 may vary at least one of the brightness, size, shape, color, and text of the control user interface, which is being controlled.

Figure 10:
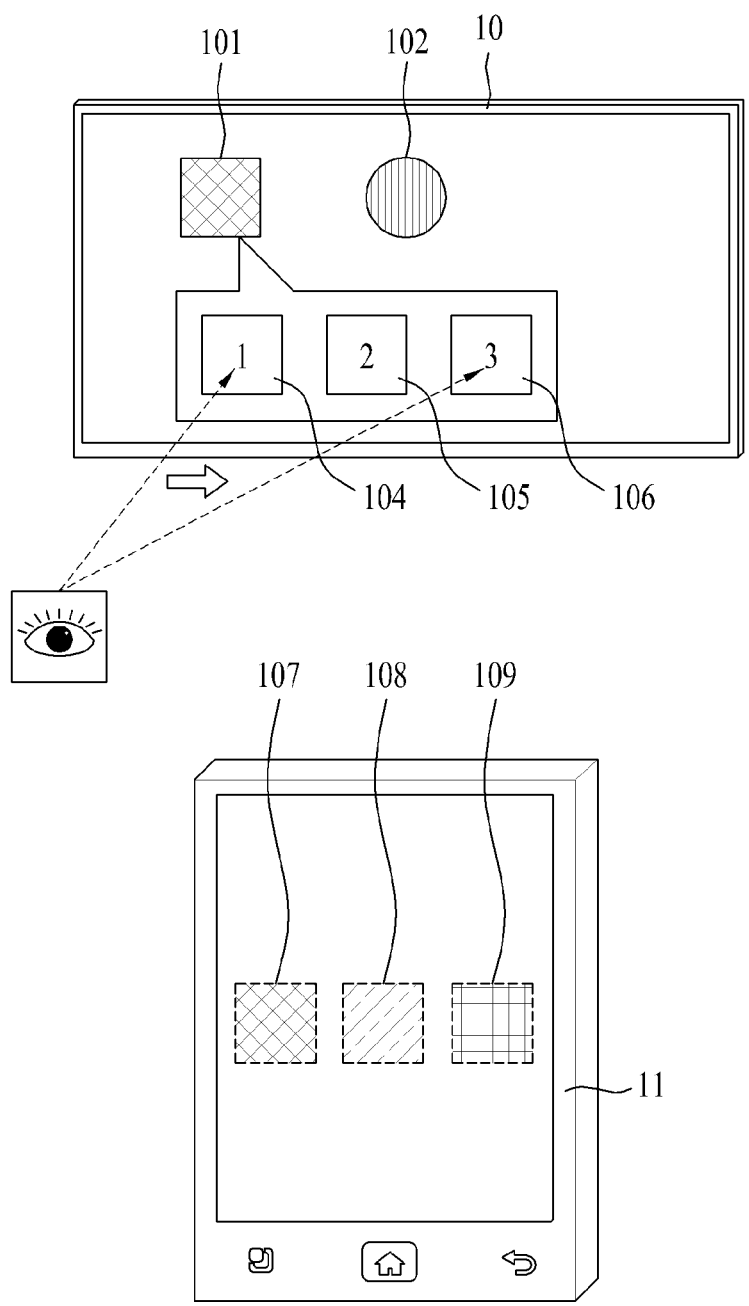
FIG. 10 illustrates a method for providing a sub-control interface in group units according to an exemplary embodiment of the present invention.

FIG. 10 illustrates a method for providing a sub-control user interface in group units according to an exemplary embodiment of the present invention. The display device 10 may display a control user interface including sub-control user interfaces. When the user selects a corresponding control user interface by using his gaze, the portable device may detect the gaze of the user, thereby being capable of displaying multiple sub-control user interfaces being included in the control user interface, which is selected by the user with his gaze. When multiple sub-control user interfaces exist with respect to the control user interface, the display device 10 may also collectively transmit information for providing the portable device with the multiple sub-control user interfaces to the portable device 11. As described above, multiple sub-control user interfaces belonging to a single control user interface may also be referred to as sub-control user interfaces being included in the same group. When the gaze of the user moves to and from the sub-control user interfaces being included in the same group, the display device 10 may also collectively transmit information for providing the portable device with the sub-control user interfaces being included in the same group, regardless of the user's gaze, to the portable device 11.

Referring to FIG. 10, the display device 10 may display first and second control user interfaces 101 and 102. The display device 10 may sense the user's gaze, thereby being capable of detecting which one of the control user interface is selected by the user with his gaze. When the user selects the first control user interface 101 within his gaze, the display device may display a group indicator 103 indicating that the selected control user interface belongs to the same group. And, then, the display device 10 may display multiple sub-control user interfaces 104, 105, and 106 being included in the first control user interface 101. The display device 10 may transmit information on the multiple sub-control user interfaces 104, 105, and 106 to the portable device 11. The portable device 11 may provide the user with the multiple sub-control user interfaces 107, 108, and 109 in accordance with the information received from the display device 10. The portable device 11 may provide tactile sub-control user interfaces 107, 108, and 109 respective to each of the sub-control user interfaces 104, 105, and 106 being included in the same group.

The portable device 11 may detect information on the sub-control user interfaces 104, 105, and 106, which are received from the display device 11, or may detect the fact that the gaze of the user has been moved in accordance with the user gaze information. Herein, as shown in FIG. 10, when the gaze of the user has moved to and from the sub-control user interfaces 104, 105, and 106 being included in the same group, the portable device 11 may maintain the positions of the tactile sub-control user interfaces 107, 108, and 109 without having to move the sub-control user interfaces 107, 108, and 109 along the user's gaze. Accordingly, the user may be simultaneously provided with the tactile sub-control user interfaces 107, 108, and 109 being included in the same group from the portable device 11, thereby being capable of controlling the display device 10.

Figure 11:
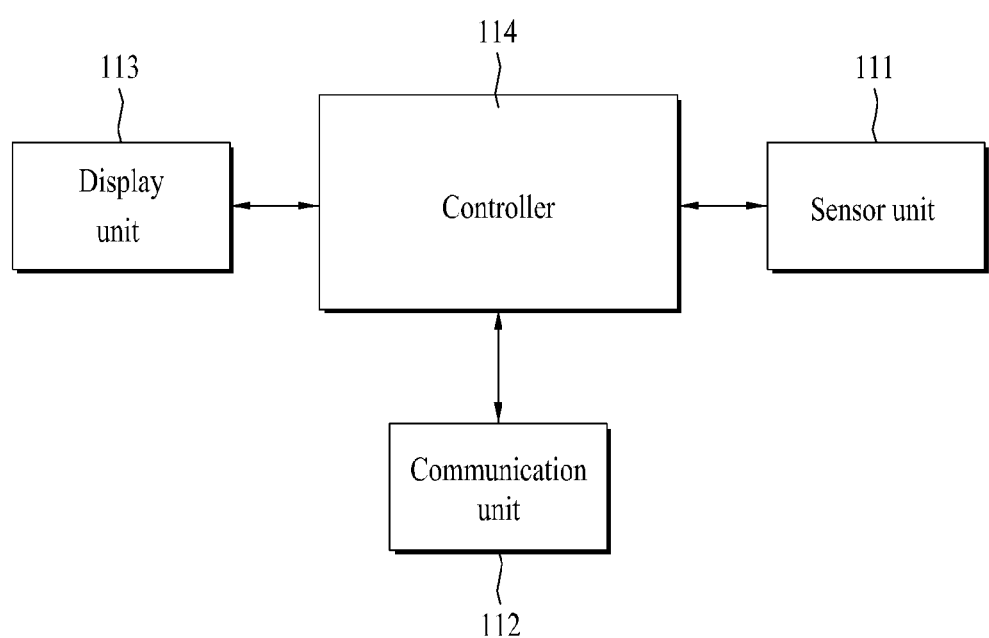
FIG. 11 illustrates a block view showing a display device according to an exemplary embodiment of the present invention.

FIG. 11 illustrates a block view showing a display device according to an exemplary embodiment of the present invention. The display device may include a sensor unit 111, a communication unit 112, a display unit 113, and a controller 114.

The sensor unit 111 may use multiple sensors equipped in the display device, so as to deliver a user input or an environment recognized by the display device to the controller 114. The sensor unit 111 may include a video sensor or image sensor that can detect the user's gaze. The video sensor or image sensor may track the gaze of the user or may sense rotating movements of the user's face, thereby delivering the respective information to the controller. Based upon the delivered information, the controller may decide which control user interface is being selected by the user's gaze.

The communication unit 112 may use the portable device, which is connected to the display device, and may also use diverse protocols in order to perform communication and to transmit/receive digital data. The communication unit 112 may be connected to the portable device via wired or wireless connection, thereby being capable of transmitting/receiving digital data. The communication unit 112 may transmit information for providing the portable device with the control user interface being selected by the user with his gaze, or transmit information for providing the portable decide with a sub-control user interface of the corresponding control user interface, to the portable device. Additionally, the communication unit 112 may also transmit information on the movement of the user's gaze to the portable device. The communication unit 112 may receive a control signal respective to the control user interface of the user from the portable device, thereby delivering the received control user interface to the controller 112.

The display unit 113 may output contents and a control user interface to a display screen. The display unit 113 may display the control user interface, so that the user can control the display device. Moreover, according to the embodiment of the present invention, when the user selects a control user interface, the display device may display at least one or more sub-control user interfaces, which are included in the corresponding control user interface. Additionally, the display unit 113 may display a gaze indicator indicating a control user interface being selected by the user with his gaze. Furthermore, the display unit 113 may display a touch indicator respective to the control user interface, which is selected by the user in the portable device, among the multiple control user interfaces. The display unit 113 may include a flexible display.

The controller 114 may execute diverse applications and may process the data existing within the display device. The controller 114 may control the units included in the above-described display device and may manage data transmission/reception to and from the units. In the description of the present invention, the controller 114 may receive information on the user's gaze information, and may decide a control user interface respective to the user's gaze, among the multiple control user interfaces being displayed on the display unit 113. The controller 114 may use the communication unit 112, so as to be capable of transmitting the information for providing the portable device with a sub-control user interface of the decided control user interface to the portable device. Additionally, the controller 114 may receive a control signal from the portable device through the communication unit 112, so as to execute the received control signal. FIG. 11 illustrates a block view of the display device according to the exemplary embodiment of the present invention, wherein the separately marked blocks illustrate logically differentiated elements of the display device. Therefore, the above-described elements of the display device may be equipped in the form of a single chip or in the form of multiple chips depending upon the design of the display device.

Figure 12:
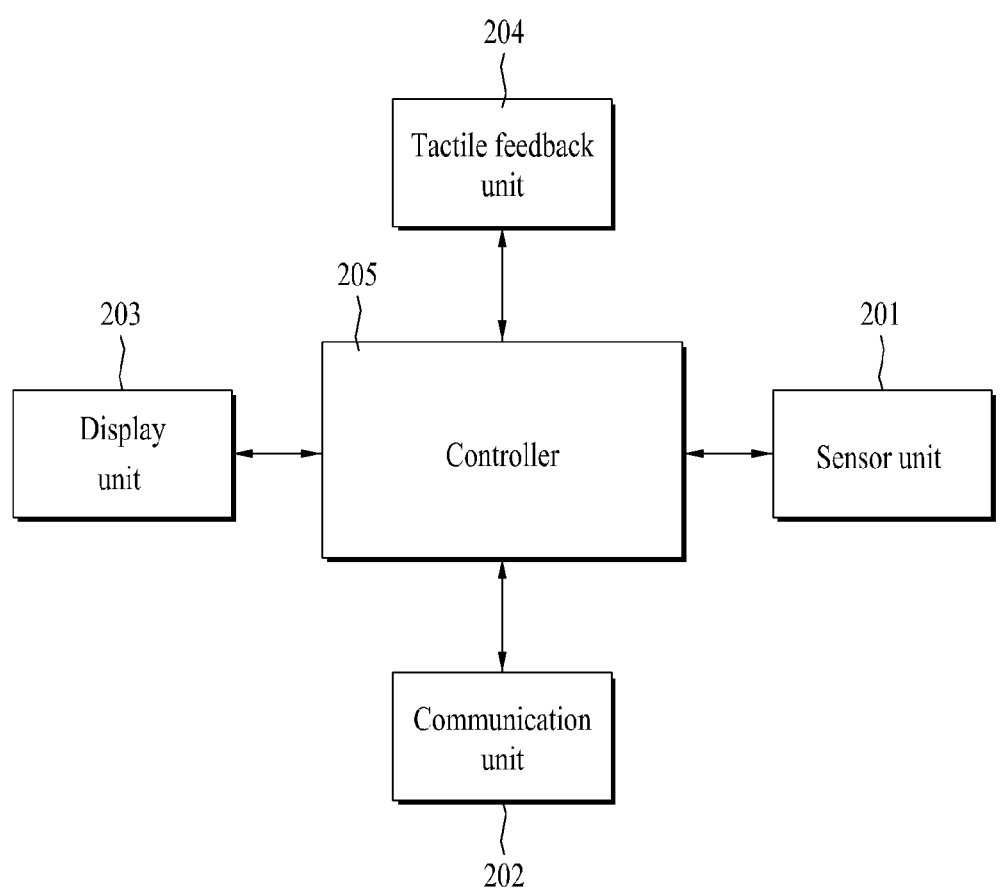
FIG. 12 illustrates a block view showing a portable device according to an exemplary embodiment of the present invention.

FIG. 12 illustrates a block view showing a portable device according to an exemplary embodiment of the present invention. The portable device may include a sensor unit 201, a communication unit 202, a display unit 203, a tactile feedback unit 204, and a controller 205.

The sensor unit 201 may use multiple sensors equipped in the portable device, so as to deliver the user's input to the controller 205. The sensor unit 201 may include a plurality of sensing means. According to an embodiment of the present invention, the plurality of sensing means may include a piezoelectric sensor, a pressure sensor, an audio sensor, a video sensor, a touch sensor, and so on. In the description of the present invention, the piezoelectric sensor, the pressure sensor, and the touch sensor may detect the user's touch input. The sensor unit 201 may transmit the sensed touch input or the pressure of the sensed touch input to the controller 205, and the controller 205 may generate a control signal with respect to the transmitted touch input or pressure of the touch input. The above-described sensors may be included in the portable device as separate elements or may be included in an integrated form of at least one or more elements.

The communication unit 202 may use the display device, which is connected to the portable device, and diverse protocols, so as to perform communication and to transmit/receive data. The communication unit 202 may be connected to the display device via wired or wireless connection, thereby being capable of transmitting/receiving digital data. The communication unit 202 may receive information for providing the portable device with the control user interface, or receive information for providing the portable decide with a sub-control user interface, from the display device, thereby delivering the corresponding information to the controller 205. Additionally, the communication unit 202 may also transmit a control signal, which is generated with respect to a touch input or a pressure of a touch input respective to a sub-control user interface, to the display device.

The display unit 203 may output an image on a display screen. In the description of the present invention, the display unit may correspond to an optional structure. When the display corresponds to a touch sensitive display, the display unit 203 may be used as the above-described touch sensor. Accordingly, the display unit 203 may detect a touch input applied to the display unit 203, thereby delivering the detected touch input to the controller 205. The display unit 203 may perform the function of displaying an image on a display panel or the function of controlling an image display. In the description of the present invention, the display unit 203 may be coupled with a tactile feedback unit 204, which will hereinafter be described in detail, so as to be capable of providing a tactile feedback to the user. The display unit 203 may include a flexible display. Depending upon the embodiment of the present invention, instead of including a display unit 203, the portable device may substitute the display unit 203 with the sensor unit 201 and the tactile feedback unit 204.

The tactile feedback unit 204 may provide the user with a tactile control user interface. The user may verify the tactile control user interface by his touch and may control the portable device in accordance with the verified tactile control user interface. A method performed by the tactile feedback unit 204 for providing a tactile control user interface to the user will hereinafter be described in detail. A tactile feedback respective to a user's finger or stylus touching the portable device may be provided by using a fine oscillation actuator. The tactile feedback unit 204 may adjust an oscillation frequency and an oscillation size and may adjust friction between the user's finger and the portable device in accordance with the adjusted oscillation frequency and oscillation size. According to another embodiment of the present invention, the tactile feedback unit 204 may generate fine electric current over the display unit so as to provide tactile feedback to the user. The tactile feedback unit 204 may adjust the intensity of the electric current and current generation cycle period. And, the user may sense a different touch in accordance with the adjusted current intensity or generation cycle. Additionally, the tactile feedback unit 204 may provide tactile feedback by using ultrasonic resonance. The tactile feedback unit 204 may generate multiple ultrasonic sound waves and may resonate the generated ultrasonic sound waves at a specific area, thereby being capable of providing the tactile feedback. The tactile feedback unit 204 may adjust the size of the resonance frequency and the cycle period for generating resonance, thereby providing different tactile feedback.

The controller 205 may execute diverse applications and may process data existing in the portable device. The controller 205 may control the units of the above-described portable unit and may manage the data transmission/reception to and from the units. In the description of the present invention, the controller 205 may receive touch input information of the user from the sensor unit 201 and may generate control signals respective to the control user interface corresponding to the received touch input information. The controller 205 may use the communication unit 202, so as to transmit the generated control signal to the display device. FIG. 12 illustrates a block view of the display device according the embodiment of the present invention, wherein the separately marked blocks illustrate logically differentiated elements of the display device. Therefore, the above-described elements of the display device may be equipped in the form of a single chip or in the form of multiple chips depending upon the design of the display device.

Figure 13:
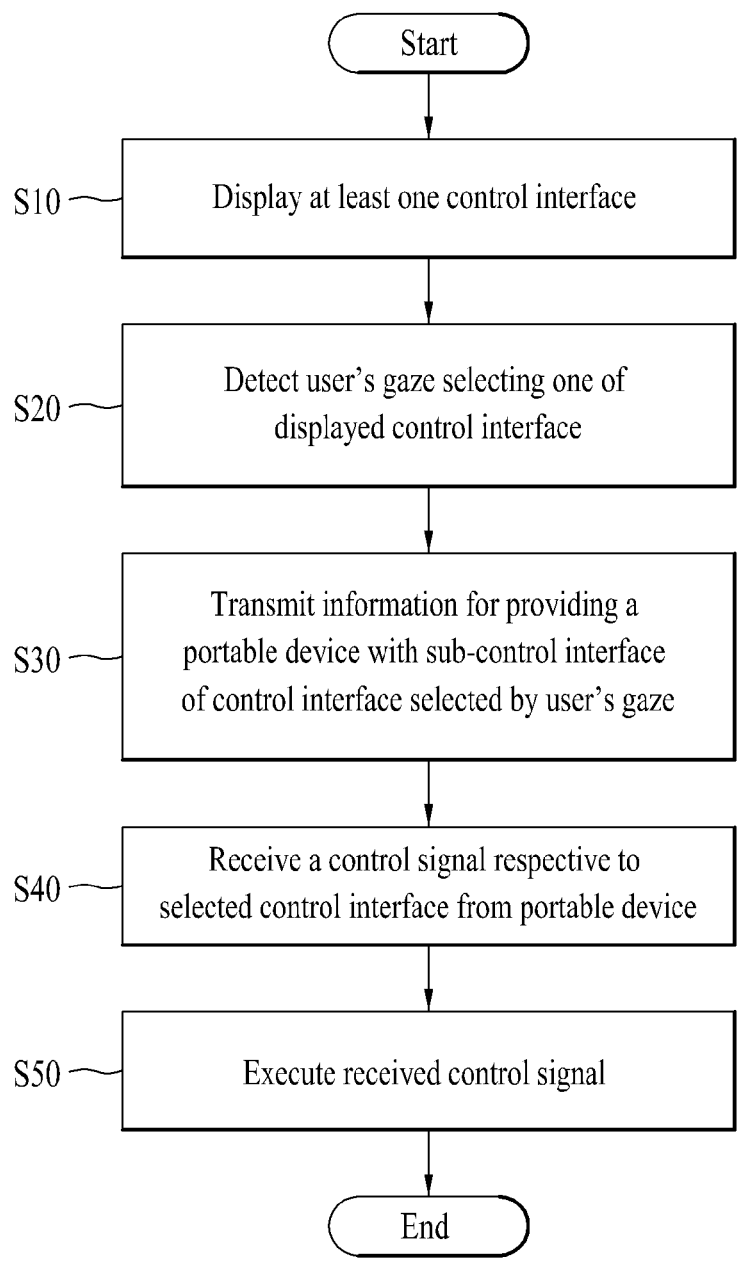
FIG. 13 illustrates a flow chart showing a method of operating the display device according to an exemplary embodiment of the present invention.

FIG. 13 illustrates a flow chart showing a method of operating the display device according to an exemplary embodiment of the present invention. The display device may display at least one control user interface by using a display unit (S10). As described above, with reference to FIG. 4 to FIG. 10, the display device may display at least one control user interface while displaying image contents. The control user interface may signify a user interface for controlling the display device. For example, the control user interface may include a user interface controlling a channel, a volume, and contents playback of the display device. The display device may display a hierarchical control user interface, and each of the control user interfaces may include at least one sub-control user interface. Depending upon the embodiment of the present invention, the display device may display the control user interface along with the sub-control user interfaces included in the control user interface.

The display device may detect a user's gaze for selecting at least one of the control user interfaces by using the sensor unit (S20). As described above with reference to FIG. 1 and FIG. 11, the display may detect the user's gaze by using the sensor unit. The display device may track the viewing direction of the user's gaze, so as to decide which one of the displayed control user interface is being selected by the user's gaze. The display device may decide the control user interface, which is selected by the user's gaze, as the control user interface that the user wishes to control.

The display device may transmit information for providing the portable device with a sub-control user interface of the control user interface, which is selected by the user's gaze, to the portable device by using the communication unit (S30). As described above with reference to FIG. 1, the display device may transmit information for providing the portable device with a sub-control user interface in order to allow the user to control the display device through the control user interface to the portable device. The information for providing the portable device with a sub-control user interface may include information on the selected control interface. The information for providing the portable device with the sub-control user interface may include information on the shape, size, and position of the sub-control user interface. Additionally, the information for providing the portable device with the sub-control user interface may include information on the function of the sub-control user interface. Depending upon the embodiment of the present invention, the information for providing the portable device with the sub-control user interface may include information activating the sub-control user interface, which is stored in the portable device. Furthermore, depending upon the embodiment of the present invention, an interface identical to the selected control user interface, which is selected by the user's gaze, may be transmitted to the portable device as the information for providing the portable device with the sub-control user interface.

As described above, with reference to FIG. 5, the display device may extract only a portion of the control user interface, which is being displayed, and may transmit the extracted portion to the portable device as the information for providing the portable device with the sub-control user interface. For example, the display device may extract only a portion of the displayed control user interface that can be controlled by the user and moved accordingly. Then, the display device may transmit the extracted portion of the displayed control user interface to the portable device.

As described above with reference to FIG. 7, when the control user interface being selected by the user with his gaze is changed, the display device may transmit the information for providing the portable device with the sub-control user interface of the changed control user interface to the portable device. Accordingly, the information for providing the portable device with the sub-control user interface, which is to be adaptively transmitted to the portable device in accordance with the user's gaze, may be updated.

The display device may receive a control signal respective to the control user interface, which is transmitted from the portable device, by using the communication unit (S40). As described above with reference to FIG. 1 and FIG. 12, the portable device may provide the sub-control user interface and may receive the user's touch input. The portable device may generate a control signal of the user corresponding to the sub-control user interface with respect to the user's touch input and may transmit the generated control signal to the display device. Accordingly, the display device may receive the control signal of the user corresponding to the sub-control user interface, which was transmitted to the portable device.

The display device may perform the received control signal by using the controller (S50). The display device may perform the user's input corresponding to the control user interface in accordance with the received control signal.

Figure 14:
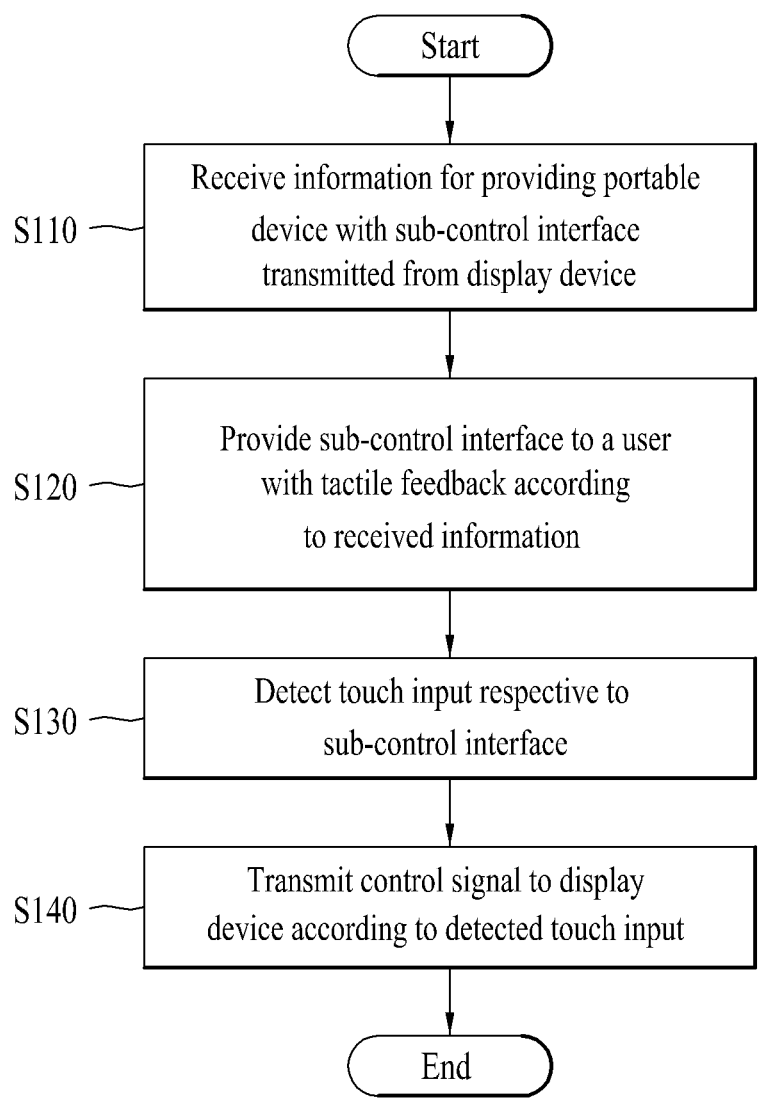
FIG. 14 illustrates a flow chart showing a method of operating the portable device according to an exemplary embodiment of the present invention.

FIG. 14 illustrates a flow chart showing a method of operating the portable device according to an exemplary embodiment of the present invention. The portable device may receive information for providing the portable device with the sub-control user interface, which is transmitted from the display device, by using the communication unit (S110). As described above with reference to FIG. 1 and FIG. 12, the portable device may be connected to the display device through a network. The portable device may receive the information for providing the portable device with the sub-control user interface, which is transmitted by the display device.

The portable device may provide the user with the sub-control user interface by using a tactile feedback unit (S120). As described above with reference to FIG. 3 and FIG. 12, the portable device may provide tactile feedback to the user with respect to the information for providing the portable device with the received sub-control user interface. The sub-control user interface being provided through the tactile feedback may also be referred to as a tactile sub-control user interface. The tactile sub-control user interface may be provided to the user through the tactile feedback as a subordinate menu belonging to the control user interface, which is displayed on the display device.

For example, as described above with reference to FIG. 2, when the control user interface of the display device corresponds to a channel control user interface, the tactile sub-control user interface of the portable device may each correspond to Channel Up and Channel Down tactile buttons.

Moreover, when the control user interface of the display device corresponds to a volume control user interface, the tactile sub-control user interface of the portable device may each correspond to a Volume Up, Volume Down, and Mute tactile buttons. Furthermore, when the control user interface of the display device corresponds to a playback control user interface, the tactile sub-control user interface of the portable device may each correspond to a Play, Fast Forward, Rewind, and Stop tactile buttons.

Additionally, as described above with reference to FIG. 5, the tactile sub-control user interface may correspond to an extract portion of a control user interface, which is being displayed by the display device. For example, the tactile sub-control user interface may correspond only to a movable portion, which can be moved by the control of the user, from the control user interface being displayed on the display device. In case of the slider user interface, which is displayed on the display device, the slider user interface may include a movable slider and a bar showing the movement path of the slider. The portable device may extract only the slider, excluding the bar, from the slider user interface, thereby providing the extracted slider to the user as the tactile sub-control user interface. When the tactile sub-control user interface is provided to the user, and when the user's touch input has already been detected, the portable device may provide the tactile sub-control user interface to area where the user's touch input has been detected. The portable device may use the tactile feedback in order to provide the position, size, and shape of the sub-control user interface to the user by using the tactile feedback.

The portable device may detect a touch input of the user respective to the tactile sub-control user interface by using the sensor unit (S130). As described above with reference to FIG. 1 and FIG. 12, the portable device may detect a user's touch input, which may control a tactile sub-control user interface. The user may control the display device through the tactile sub-control user interface. Depending upon the touch input of the user, a control signal respective to the corresponding sub-control user interface may be generated. For example, when the user has touched a Volume Up tactile button, a control signal for increasing the volume of the display device may be generated. Furthermore, when the user has touched a Rewind tactile button, a control signal for rewinding the contents currently being played-back on the display device may be generated.

As described above with reference to FIG. 7, when the user's touch input is detected, the portable device may transmit information, which indicates that the user is controlling the tactile sub-control user interface, may be transmitted to the display device. After receiving the transmitted information, the display device may temporarily stop updating the information for providing the portable device with a sub-control user interface in accordance with the movement of the user's gaze.

The portable device may transmit a control signal respective to the detected touch input to the display device by using the communication unit (S140). As described above with reference to FIG. 12, the portable device may transmit the generated control signal to the display device. The control signal, which is transmitted from the portable device, may include information controlling the display device.

As described above, the user may select a control user interface, which the user seeks to control by using his gaze, and may control the sub-control user interface of the corresponding control user interface by using the touch input. Accordingly, the present invention may control the sub-control user interface without searching through the complicated hierarchical control user interface.

As described above, the display device and the controlling method thereof may have the following advantages. According to the present invention, the display device may provide a user interface that can allow the user to control the display device while continuously viewing the displayed contents without interruption. Also, according to the present invention, the display device may simultaneously provide control user interface and sub-control user interface of a hierarchical control user interface.

Additionally, according to the present invention, the display device may provide an interface having a function that is to be controlled by the user by recognizing the user's gaze. Moreover, according to the present invention, the display device may provide the user with a tactile interface by using a portable device being connected with the display device. Furthermore, according to the present invention, the display device may be controlled in accordance with a control signal respective to the user's gaze and touch input.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
    a display unit configured to display a first user interface;
    a sensor unit configured to detect a user's gaze selecting the displayed first user interface;
    a communication unit configured to transmit information of the selected first user interface for providing a portable device with a second user interface to control the selected first user interface, to the portable device, to generate tactile buttons corresponding to the second user interface on the portable device, and to receive a control signal respective to the tactile buttons of the second user interface from the portable device; and
    a controller configured to execute the received control signal,
    wherein the portable device is configured to receive the information of the selected first user interface transmitted from the display device, to provide the second user interface according to the received information of the selected first interface, to detect a touch input respective to the second user interface, and to transmit the control signal according to the detected touch input to the display device,
    wherein the second user interface is a subordinate user interface of the first user interface in a hierarchical user interface,
    wherein the first user interface is displayed not in the portable device but in the display device, and
    wherein the second user interface is displayed not in the display device but in the portable device.

2. The display device of claim 1, wherein the tactile buttons represent a position, size, and shape of the second user interface.

3. The display device of claim 1, wherein the first user interface includes a fixed control interface and a movable control interface, and
    wherein the second user interface is the movable control interface corresponding to at least a portion of the first user interface.

4. The display device of claim 3, wherein the portable device positions the movable control interface of the second user interface to an area where the touch input is detected, and transmits the control signal controlling the movable control interface of the first user interface to the display device.

5. The display device of claim 1, wherein the information of the selected first user interface includes information on the first user interface, information activating the second user interface being provided by the portable device, or information on a shape and size of the second user interface.

6. The display device of claim 1, wherein the first user interface includes a slider interface, and wherein the slider interface includes a slider and a bar corresponding to a movement path of the slider.

7. The display device of claim 6, wherein the slider interface divides a touch sensitive area of the portable device into a first area and a second area with respect to the bar, and wherein, when the slider is moved by the touch input on the first area, and when the slider is moved by the touch input on the second area, a different control signal is generated respectively.

8. The display device of claim 1, wherein the first user interface and the second user interface corresponding to the first user interface have the same shape.

9. The display device of claim 1, wherein, when the display device further displays a third user interface and the user's gaze is moved from the first user interface to the third user interface, information of the third user interface is provided to the portable device according to the user's gaze.

10. The display device of claim 1, wherein, when the portable device detects a touch input respective to the second user interface, the sensor unit temporarily pauses a process of detecting the user's gaze for the first user interface.

11. The display device of claim 1, wherein, when the display device further displays a third user interface, the communication unit transmits the information of the selected first user interface along with information of the third user interface for providing the portable device with a fourth user interface, to the portable device, wherein the fourth user interface is a subordinate user interface of the third user interface which is not selected by the user's gaze.

12. The display device of claim 11, wherein the portable device provides the reduced-size fourth user interface.

13. The display device of claim 1, wherein the first user interface is a playback control interface, and wherein the second user interface includes at least one of Play, Pause, Stop, Fast Forward, and Rewind.

14. The display device of claim 1, wherein the first user interface is a volume control interface, and wherein the second user interface includes at least one of Volume Up, Volume Down, and Mute.

15. The display device of claim 1, wherein the first user interface is a channel control interface, and wherein the second user interface includes at least one of Channel Up, Channel Down, and Return to Previous Channel.

16. The display device of claim 1, wherein, when the touch input to the second user interface is detected by the portable device, the display unit is further configured to display an indicator indicating that the first user interface is under control.

17. The display device of claim 1, wherein, when the first user interface is selected, the display unit is further configured to display an indicator indicating that the first user interface is selected by the user's gaze.

18. The display device of claim 1, wherein the second user interface is provided with tactile feedback on the portable device.

19. A method for controlling a display device, the method comprising:
   displaying a first user interface;
   detecting a user's gaze selecting the displayed first user interface;
   transmitting information of the selected first user interface for providing a portable device with a second user interface to control the selected first user interface, to the portable device;
   generating tactile buttons corresponding to the second user interface on the portable device;
   receiving a control signal respective to the tactile buttons of the second user interface from the portable device; and
   executing the received control signal,
   wherein the portable device is configured to receive the information of the selected first user interface transmitted from the display device, to provide the second user interface according to the received information of the selected first user interface, to detect a touch input respective to the second user interface, and to transmit the control signal according to the detected touch input, to the display device,
   wherein the second user interface is a subordinate user interface of the first user interface in a hierarchical user interface,
   wherein the first user interface is displayed not in the portable device but in the display device, and
   wherein the second user interface is displayed not in the display device but in the portable device.

* * * * *